United States Patent
Sponsky et al.

(10) Patent No.: US 8,939,174 B2
(45) Date of Patent: Jan. 27, 2015

(54) CARTRIDGE EGR VALVE ASSEMBLY

(75) Inventors: John Sponsky, Chambersburg, PA (US); John Lowe, Bedford, PA (US)

(73) Assignee: Mack Trucks, Inc., Greensboro, NC (US)

( * ) Notice: Subject to any disclaimer, the term of this patent is extended or adjusted under 35 U.S.C. 154(b) by 128 days.

(21) Appl. No.: 13/991,220

(22) PCT Filed: Dec. 20, 2010

(86) PCT No.: PCT/US2010/061232
§ 371 (c)(1),
(2), (4) Date: Jun. 3, 2013

(87) PCT Pub. No.: WO2012/087271
PCT Pub. Date: Jun. 28, 2012

(65) Prior Publication Data
US 2013/0248752 A1    Sep. 26, 2013

(51) Int. Cl.
*F16K 11/04* (2006.01)
*F02M 25/07* (2006.01)

(52) U.S. Cl.
CPC .......... *F02M 25/07* (2013.01); *F02M 25/0792* (2013.01); *F02M 25/0796* (2013.01); *Y02T 10/121* (2013.01); *F02M 25/0744* (2013.01); *F02M 25/0748* (2013.01); *F02M 25/0794* (2013.01)
USPC ..................... 137/625.5; 137/625.18; 251/367

(58) Field of Classification Search
USPC ................. 137/625.18, 625.48, 625.5, 454.2; 251/367
See application file for complete search history.

(56) References Cited

U.S. PATENT DOCUMENTS

| | | | | |
|---|---|---|---|---|
| 2,879,788 A | * | 3/1959 | Beckett et al. | 137/454.6 |
| 3,572,631 A | * | 3/1971 | Ritchart | 251/210 |
| 4,493,476 A | * | 1/1985 | Strickland et al. | 251/176 |
| 5,839,471 A | * | 11/1998 | Yang | 137/625.18 |
| 6,247,461 B1 | | 6/2001 | Smith et al. | |
| 7,343,908 B2 | | 3/2008 | Lohmann | |
| 2007/0144503 A1 | | 6/2007 | Lohmann | |
| 2007/0170391 A1 | | 7/2007 | Liimatta et al. | |
| 2008/0245427 A1 | | 10/2008 | Williams et al. | |

FOREIGN PATENT DOCUMENTS

| | | |
|---|---|---|
| DE | 19951591 C1 | 1/2001 |
| FR | 2858013 A1 | 1/2005 |
| WO | 0175343 A1 | 10/2001 |

OTHER PUBLICATIONS

Extended European search report dated May 16, 2014 for corresponding EP application No. 10860899.3.
International Search Report and Written Opinion of corresponding PCT/US2010/061232.

* cited by examiner

*Primary Examiner* — John Fox
(74) *Attorney, Agent, or Firm* — Martin Farrell; Michael Pruden

(57) ABSTRACT

A drop-in cartridge style, four-chamber EGR valve, includes a valve actuator, a valve stem extending from the valve actuator and having two valve heads mutually spaced on the stem, and a frame having a plurality of longitudinally extending members connected by at least first and second ring members, the frame being divided along a longitudinal axis into two mating parts.

7 Claims, 3 Drawing Sheets

US 8,939,174 B2

CARTRIDGE EGR VALVE ASSEMBLY

FIELD OF THE INVENTION

The invention relates to valve assemblies for exhaust gas recirculation, and more particularly, to a valve assembly that can be easily assembled and installed in an exhaust gas recirculation system.

BACKGROUND AND SUMMARY

Exhaust gas recirculation EGR systems in internal combustion engines are controlled or metered by an EGR valve. The EGR valve meters the amount of EGR that will be introduced into the engine. The inlet flows and outlet flow are controlled by an EGR valve.

As shown in FIG. 1, cartridge-style EGR valves 10 typically include an actuator 12 and a valve stem 14 having two valve heads 16, 18. As shown in FIG. 1, the valve device 10 is placed in a valve housing 20 in the exhaust manifold or EGR valve body of an engine, which must have valve seats 22 machined or inserted therein. The valve heads 16, 18 are shown in the open position. This arrangement allows for three chamber EGR metering; the valve can control two inlet passages 24, 26 which join to form a single outlet passage 28. This does not permit full use of the pressure pulses in the exhaust flow by the turbocharger system or the EGR system.

The invention provides a solution in a drop-in cartridge style, four-chamber EGR valve.

According to the invention, the cartridge valve includes a valve actuator, a valve stem extending from the valve actuator and having two valve heads mutually spaced on the stem, and a cage or frame having a plurality of axially extending bars connected by first and second ring assemblies, the ring assemblies being circumferential members.

According to the invention, the cage is divided along a longitudinal axis into two mating parts. The division of the cage longitudinally provides a "clam shell" configuration that allows for simple assembly of the valve device. The mating parts of the cage allow the valve stem to be installed in the valve actuator and the cage assembled around the valve stem and valve heads in a simple manner.

According to the invention, the first and second ring assemblies each have formed thereon a valve seat for one of the valve heads. Thus, the requirement of machining or forming the valve seats in the valve housing is eliminated.

According to the invention, the cage may include a third ring assembly connecting the axially extending bars and disposed between the two ring assemblies with a sealing disk mounted to the third ring assembly to divide the cage axially. The sealing disk may be formed in two parts, one part being attached to each mating part of the cage, wherein, upon mating of the mating parts, the two parts of the sealing plate are joined as an integral disk.

According to the invention, the ring assemblies may include seats for accepting an o-ring, the seats being formed on a radially outer surface of each ring assembly. The assembly may further comprise an o-ring mounted in each of the seats. The o-rings are configured to contact the inner walls of valve housing formed in the exhaust manifold or EGR valve body and thus provide seals in the valve housing to seal the four chambers from one another.

Additional ring assemblies or circumferential members may be provided for structural support or for seating and sealing the frame in the valve housing.

According to the invention, the cage may include four ring assemblies, an end ring assembly providing structural rigidity to the cage.

BRIEF DESCRIPTION OF THE DRAWINGS

The invention will be better understood by reference to the following detailed description read in conjunction with the appended drawings, in which.

DETAILED DESCRIPTION

Figure 1:
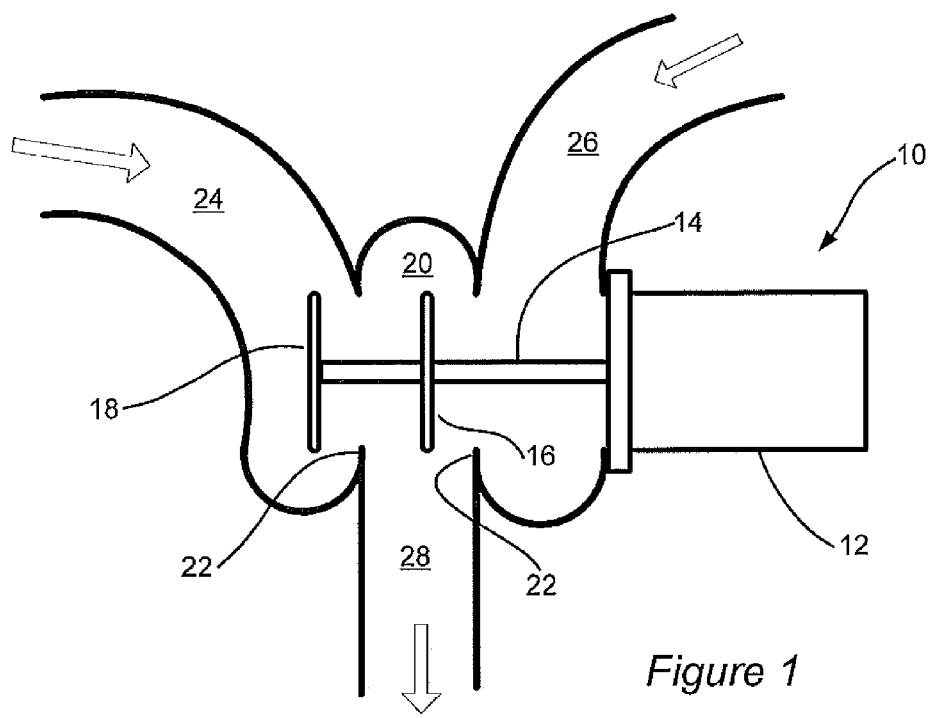
FIG. 1 is a sectional view of a valve assembly and a three-chamber EGR valve according to the prior art.
Figure 3:
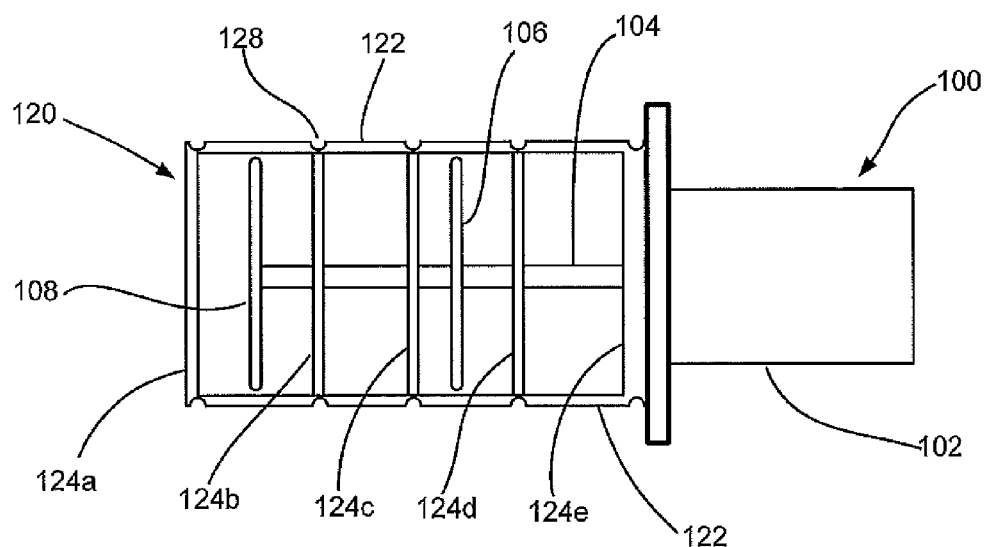
FIG. 3 is a side view of valve assembly in accordance with the invention.
Figure 2:
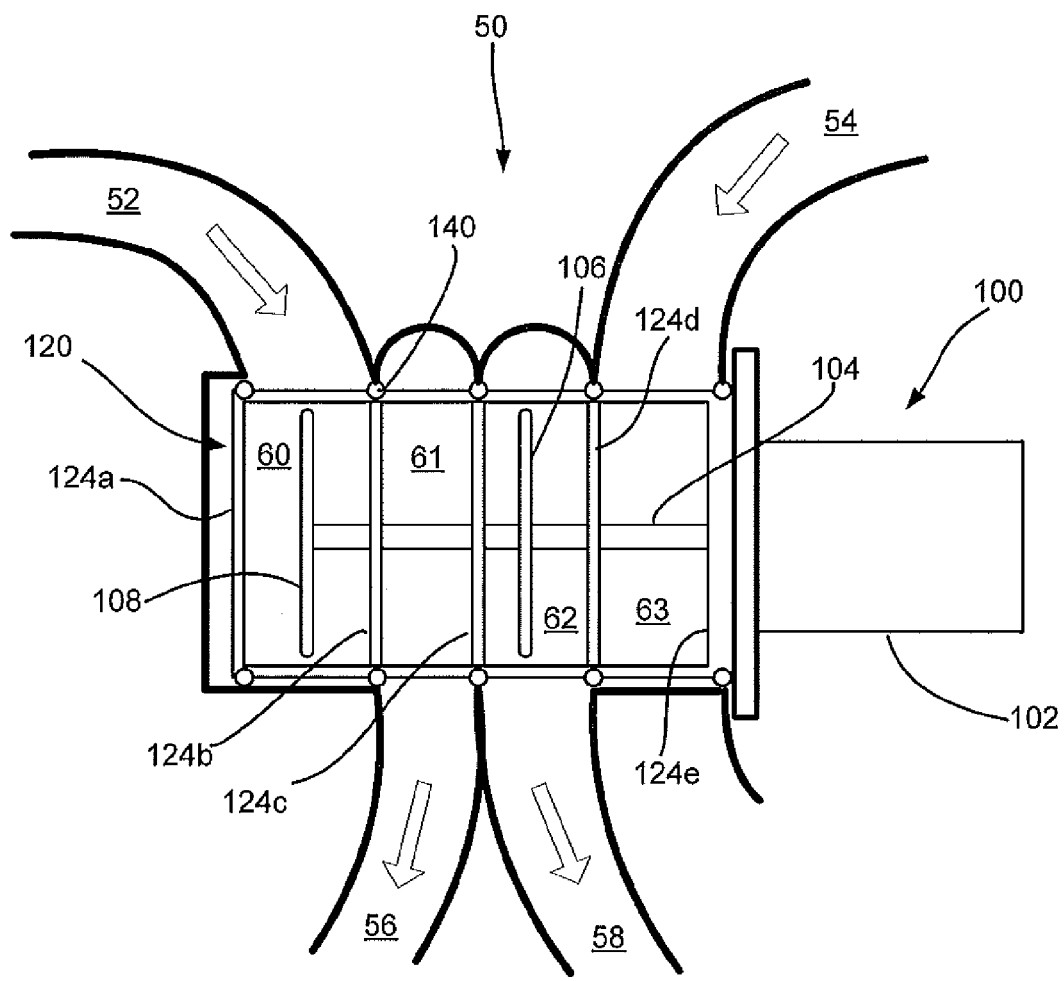
FIG. 2 is a sectional view of a valve assembly of the invention and a four-chamber EGR valve.

FIG. 2 shows an EGR valve assembly 100 installed in a four-chamber EGR valve 50 in accord with the invention. FIG. 3 shows the assembly removed from the exhaust manifold or EGR valve body.

A valve housing 50 formed in an exhaust manifold or EGR valve body includes two inlet passages 52, 54 for recirculated exhaust gas and inlet air, and two outlet passages 56, 58. As described below, the valve assembly 100 divides the valve housing 50 into four chambers 60, 61, 62, and 63.

The valve assembly 100 includes a valve actuator 102, a valve stem 104 operatively connected to and extending from the valve actuator, and two valve heads 106, 108 mounted in spaced relation on the valve stem.

According to the invention, the assembly 100 includes a cage or frame 120 that surrounds the valve stem 104 and valve heads 106, 108. The frame 120 is mounted to the valve actuator 102 by any convenient means. The frame 120 is formed by a plurality of longitudinal members 122 extending parallel or substantially parallel to the valve stem 104. The longitudinal members 122 are interconnected by circumferential members 124, spaced radially outward of the valve stem 104. In the embodiment illustrated in FIGS. 2 and 3, five circumferential members, 124a to 124e, are shown; however, it may be possible to use fewer.

The frame 120 includes at least two circumferential members that are formed with valve seats (identified as 124b and 124d) to cooperate with the valve heads 108 and 106, respectively to close portions of the valve housing 50. Referring now to FIG. 2, which shows the valve heads 106, 108 in an open position, when the valve stem 104 moves to the right in the figure, the valve head 108 contacts the valve seat formed on circumferential member 124b to close chamber 60 and prevent flow from inlet channel 52 from reaching chamber 61 and the outlet channel 56. Similarly, valve head 106 contacts the valve seat formed on circumferential member 124d to close chamber 63 and prevent flow from inlet channel 54 from reaching chamber 62 and the outlet channel 58.

Figure 4:
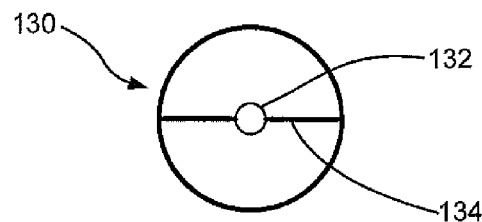
FIG. 4 is a sealing disk that may be installed in the assembly.

In the illustrated embodiment, a seal disk 130, illustrated in FIG. 4, is provided in a circumferential member 124c to separate and seal chamber 61 from chamber 62. With a seal disk 130 in the frame 120, two flow paths are defined, one including inlet passage 52, chambers 60 and 61 and outlet passage 56, and a second including inlet passage 54, chambers 62 and 63, and outlet passage 58. The disk 130 includes a centrally located hole 132 to accept the valve stem 104 and allow free movement therein. The seal disk 130 may be omitted depending on the desired flow pattern through the valve housing 50.

The frame 120 includes grooves 128 formed in radially outer surfaces of the longitudinal members 122 and circumferential members 124 to accept and retain o-rings 140 for sealing the frame in the valve housing 50. Referring to FIG. 2, the o-rings 140 contact the valve housing walls to provide seals between the frame circumferential members 124 and the valve housing 50 walls so that the frame 120 helps define the plurality of chambers 60, 61, 62, and 63.

Figure 5:
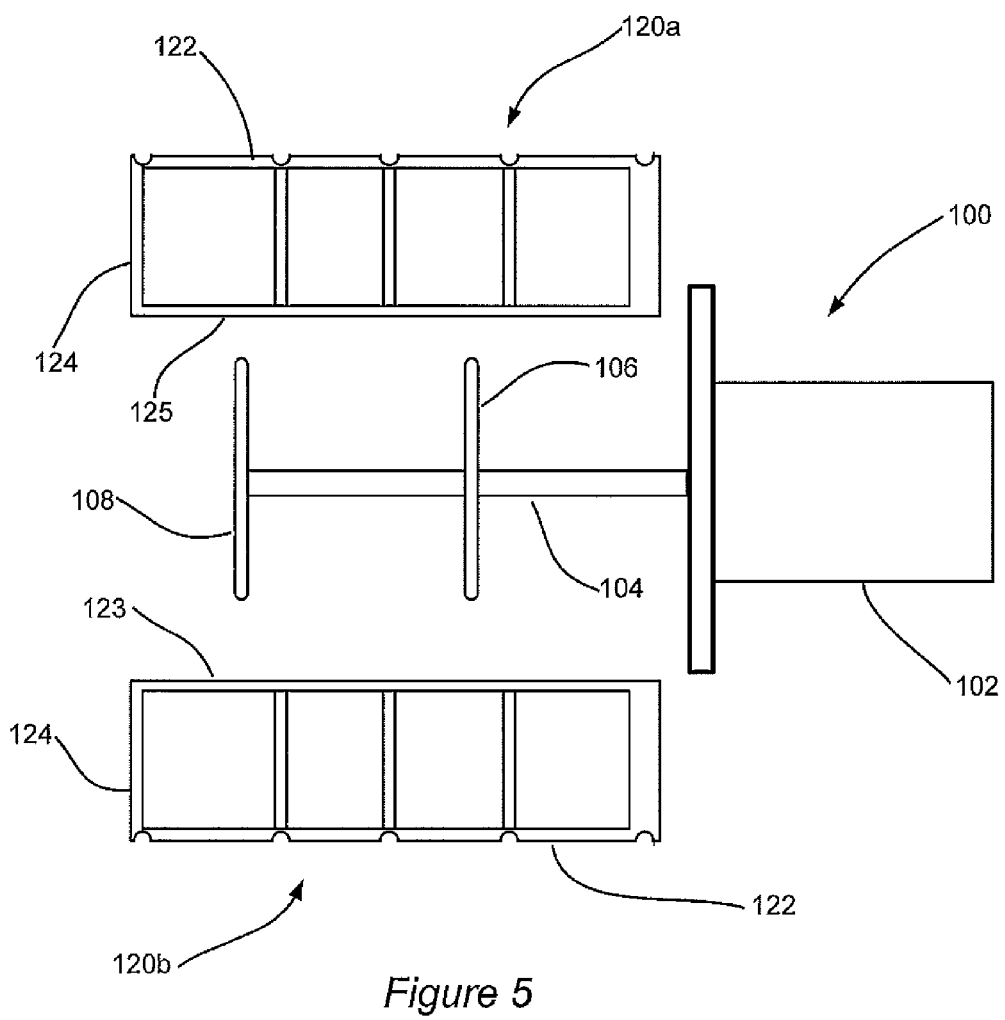
FIG. 5 is an exploded view of the valve assembly of FIG. 3.

Turning to FIG. 5, the frame 120 of the assembly is formed in two parts 120a, 120b, divided longitudinally. Each part 120a, 120b, will, with circular valve heads, be a half-cylinder and can be assembled around the valve stem 104 and valve heads 106, 108 in the manner of a clam shell. This facilitates assembly of the valve assembly. The parts 120a and 120b are joined at mating longitudinal members 123, 125 (longitudinal members on an opposite side of the parts, not visible in this view, will also mate). When a seal disk 130 is provided, the disk will be divided in two parts also, indicated by the line 134 in FIG. 4, with one disk part mounted in each of the two frame parts 120a, 120b.

The invention has been described in terms of preferred principles, embodiments and components; however, those of skill in the art will understand that substitutions of equivalent components and structure may be made without departing from the scope of the invention as defined by the appended claims.

What is claimed:

1. A four-chamber drop-in cartridge valve assembly, comprising:
   a valve actuator;
   a valve stem extending longitudinally from the valve actuator and having two valve heads mutually spaced on the stem; and,
   a frame attached to the valve actuator and extending longitudinally therefrom, the frame including first and second circumferential members, the first and second circumferential members each having formed thereon a valve seat for one of said valve heads, the frame being separable along a longitudinal axis into two parts.

2. The valve assembly as claimed in claim 1, wherein the frame comprises a plurality of longitudinal members attached to the valve actuator and extending therefrom, the plurality of longitudinal members connected by the first and second circumferential members.

3. The valve assembly as claimed in claim 2, comprising a third circumferential member connecting the longitudinal members and disposed between the first and second circumferential members, and further comprising a sealing disk mounted to the third circumferential member.

4. The valve assembly as claimed in claim 3, wherein the sealing disk is formed in two parts, one part being attached to each mating part of the frame, wherein, upon mating of the mating parts, the two parts of the sealing plate are joined.

5. The valve assembly as claimed in claim 2, wherein the longitudinal members are parallel to the valve stem.

6. The valve assembly as claimed in claim 1, wherein the first and second circumferential members each include a seat for accepting an o-ring formed on a radially outer surface thereof, and further comprising an o-ring mounted in each of said seats.

7. A method of assembling a valve cartridge assembly for an exhaust gas recirculation valve, comprising the steps of:
   providing a valve actuator;
   mounting to the valve actuator a valve stem to extend longitudinally therefrom, the valve stem having two valve heads mutually spaced thereon;
   mounting to the valve actuator a first frame part having a plurality of longitudinal members connected by at least first and second semi-circumferential members, the first and second semi-circumferential members each having formed thereon a portion of a valve seat for one of said valve heads, the frame partly enclosing the valve stem and valve heads; and,
   mounting to the valve actuator a second frame part having a plurality of longitudinal members connected by at least first and second semi-circumferential members, the first and second semi-circumferential members each having formed thereon a portion of a valve seat for one of said valve heads, wherein, the first and second frame parts are joined to enclose the valve stem and valve heads, the semi-circumferential members being joined to form valve seats.

* * * * *